United States Patent
Schaeferling et al.

(10) Patent No.: US 8,684,637 B2
(45) Date of Patent: Apr. 1, 2014

(54) ARRANGEMENT TO CONNECT A TOOL WHEEL AND A TOOL HOLDING FIXTURE

(75) Inventors: Karl Schaeferling, Unterschleissheim (DE); Gerhard Reichert, Maisach (DE)

(73) Assignee: The Gleason Works, Rochester, NY (US)

( * ) Notice: Subject to any disclaimer, the term of this patent is extended or adjusted under 35 U.S.C. 154(b) by 997 days.

(21) Appl. No.: 12/758,986

(22) Filed: Apr. 13, 2010

(65) Prior Publication Data

US 2010/0272535 A1 Oct. 28, 2010

(30) Foreign Application Priority Data

Apr. 22, 2009 (DE) .......................... 10 2009 018 392

(51) Int. Cl.
   *B26D 1/12* (2006.01)
(52) U.S. Cl.
   USPC ................... 407/44; 407/46; 407/77; 407/91; 409/8
(58) Field of Classification Search
   USPC ......... 409/8, 20; 464/106; 407/20, 30, 44, 46, 407/77, 91
   See application file for complete search history.

(56) References Cited

U.S. PATENT DOCUMENTS

| | | | |
|---|---|---|---|
| 4,909,773 A | 3/1990 | Schlecher | |
| 5,154,553 A | 10/1992 | Baumstark | |
| 5,738,586 A | 4/1998 | Arriaga | |
| 6,571,475 B1 | 6/2003 | Tomei | |
| 6,676,337 B2 | 1/2004 | Daniek | |
| 2004/0121845 A1 | 6/2004 | Delaney | |

FOREIGN PATENT DOCUMENTS

| | | |
|---|---|---|
| DE | 2256092 A1 | 5/1974 |
| DE | 3619537 C1 | 3/1987 |
| DE | 3722097 C1 | 8/1988 |
| DE | 3905168 C1 | 5/1990 |
| DE | 4020611 C1 | 5/1991 |
| DE | 19530978 A1 | 2/1997 |
| DE | 19613462 A1 | 10/1997 |
| EP | 1270127 A1 | 1/2003 |

OTHER PUBLICATIONS

Extended European Search Report for EP 10002239.1 (corresponds to U.S. Appl. No. 12/758,986), Sep. 8, 2010.
English translation of Search Report from German Patent Office for priority application DE 102009018392.2, Mar. 2010.

*Primary Examiner* — David Bryant
*Assistant Examiner* — Ryan J Walters
(74) *Attorney, Agent, or Firm* — Robert L. McDowell

(57) ABSTRACT

An arrangement for the non-rotational connection between a toothed tool wheel for the machining of end peripheral areas of tooth flanks, having an axis of rotation, and a tool holding fixture that can be rotationally driven around an axis of rotation. Said arrangement has an elastic means with a restoring force against which the direction of the axis of rotation of the tool wheel can be displaced relative to the direction of the axis of rotation of the tool holding fixture.

14 Claims, 1 Drawing Sheet

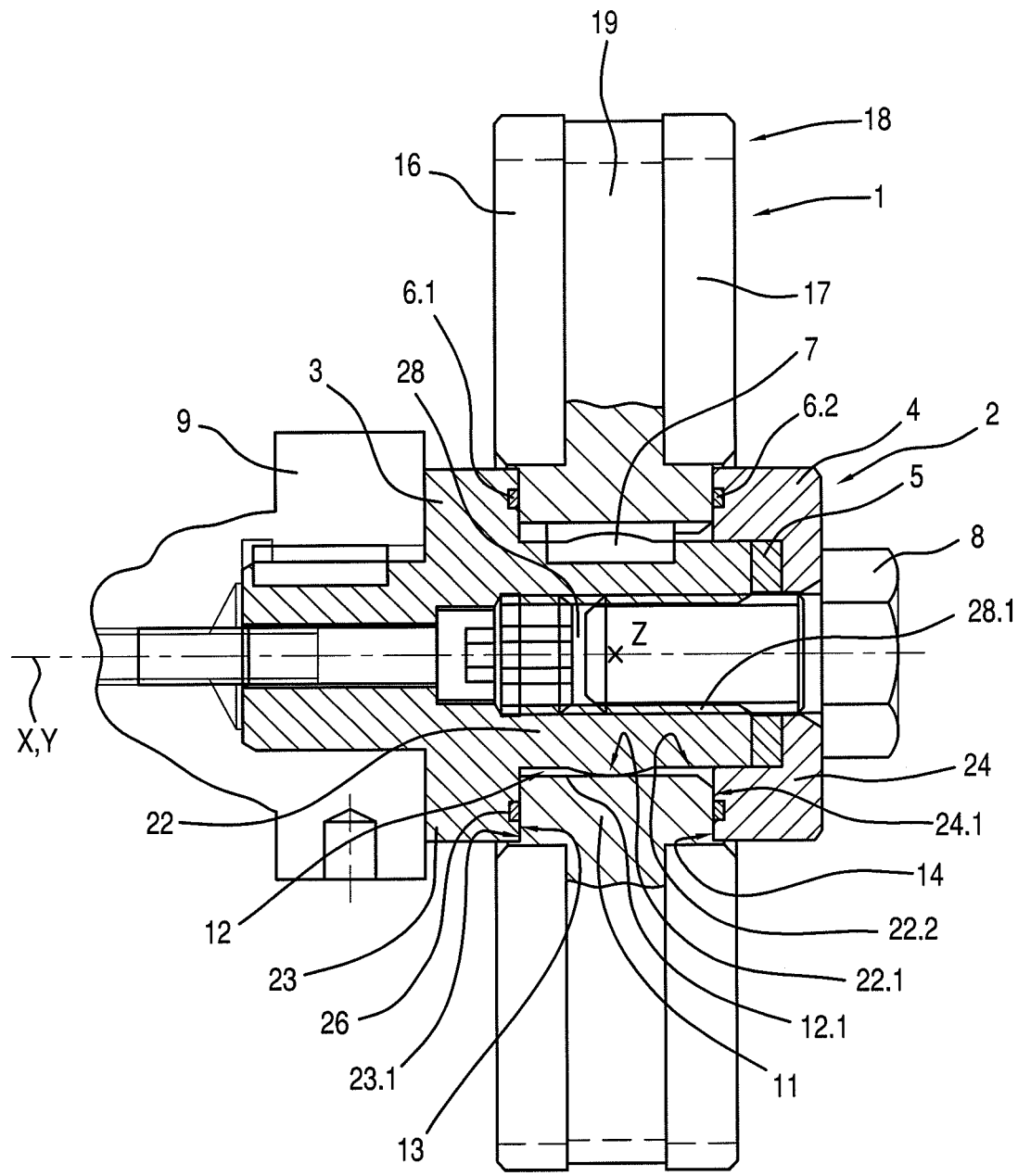

ARRANGEMENT TO CONNECT A TOOL WHEEL AND A TOOL HOLDING FIXTURE

This application claims the benefit of German Patent Application No. DE 102009018392.2 filed Apr. 22, 2009 the disclosure of which is hereby incorporated by reference.

FILED OF THE INVENTION

The invention relates to an arrangement for the non-rotational connection between a toothed tool wheel for the machining of end peripheral areas of tooth flanks of toothed work piece wheels, which has an axis of rotation, and a tool holding fixture that can be rotationally driven around an axis of rotation.

BACKGROUND OF THE INVENTION

Such arrangements are known, for example, from EP 1 270 127 A1. They are used, for example, to remove burrs formed on the end peripheral areas of the tooth flanks in the machining of gear wheels (such as hobbing, for example). Burrs must be removed for several reasons. One of the reasons is that in the subsequent work steps, an end face of the gear wheel is often used as a planar inside recess and determination surface, and the burr interferes with said planarity. Furthermore, after hardening, the burr would create the risk of breaking off later on when the gear wheel runs in a transmission, thus causing damage to the tooth flanks or to components of the transmission. Aside from that, this type of burr also represents a risk of injury during the handling of the work piece wheels, and it is not sufficient to merely remove the burr because the remaining tooth edge can be come glass-hard during hardening due to over-carburization, and then chip under pressure.

To avoid these disadvantages, the end peripheral areas of the tooth flanks are machined with a tool wheel mentioned above to transform the tooth edge into a chamfer. To that end, the tool wheel is firmly clamped into a tool holding fixture, with the axes of rotation of tool wheel and tool holding fixture coinciding, and the tool wheel rotationally meshes with the work piece wheel to be machined. The required rotary actuating force is transmitted from a tool spindle to the tool wheel via the tool holding fixture. Machining processes such as deburring, forming the chamfer, or smoothing the end peripheral areas of the tooth flanks of the work piece wheel can be performed.

For example, a tool wheel suitable for this purpose is formed by two machining deburring wheels, which are mounted into a compact tool wheel with a spacer inserted between said deburring wheels. Instead of the spacer, it is also possible to use an end-cut guide wheel. Because secondary burrs are raised in the peripheral areas of the tooth flanks that border the chamfers when the tooth edges are reworked into the chamfers, it is advantageous to develop the guide wheel as a smoothing wheel over part of its circumference to smooth the secondary burrs, as was done, for example, in EP 1 270 127 A1.

The form of the toothing of the tool wheel is adapted to the toothing of the work piece wheel. In particular, with helical gearing, the helix angles are adapted. More specifically, to obtain an optimal machining result, the tool wheel must be adapted precisely to the correction values of the work piece. Otherwise, material raised on the tooth flanks of the work piece may lead to premature tool wear during the subsequent hard metal cutting of the work piece.

However, the correction values of the work piece wheels are already subject to change due to process tolerances in the hobbing of the work piece wheels, depending on the batch, and thus the precise adjustment of a tool wheel to various batches of otherwise equal work piece wheels is no longer a given. The same applies if the correction values must be changed in view of the subsequent hardening of the work piece wheels due to different materials or different hardening furnaces.

Simply put, when the gear cutting parameters of the work piece wheels change even very slightly, the tool wheel no longer fits precisely enough for the machining of the work piece wheels. When a tool wheel is developed in one piece, this only leaves the regrinding of the toothing of the tool wheel when machining several different batches of tool wheels.

To avoid this costly process, EP 1 270 127 A1 proposes to split the tool wheel in the center so that the tool wheel halves for the machining of opposite end faces of the work piece wheels can be twisted relative to each other and arranged with a randomly selectable circumferential positioning relative to each other. With a suitable arrangement, the tool wheel can then be precisely adjusted for each individual batch. However, this adjustment requires a lot of time and effort because it must be very precise.

Because of the aforementioned problems with the prior art, the object of the invention is to improve an arrangement described above, in particular with respect to an optimally simple adjustment of the tool wheel relative to the work piece wheel to be machined.

An object of the invention is attained with a modification of the aforementioned arrangement, which is essentially characterized in that the arrangement has an elastic means with a restoring force against which the direction of the axis of rotation of the tool wheel can be displaced relative to the direction of the axis of rotation of the tool holding fixture.

SUMMARY OF THE INVENTION

The invention is based on the idea that it is not even necessary to change the tool wheel to machine various batches of work piece wheels. Rather, because the axis of rotation of the tool wheel can be displaced against the restoring force of the elastic means, an appropriate relative positioning of work piece wheel and tool wheel is achieved automatically because the work piece wheel to be machined and the tool wheel are meshing. Assuming that the tool wheel is designed to fit a work piece of a batch with specified correction values when the axis is not displaced (the axes of rotation of tool wheel and tool holding fixture coincide), forces are exerted on the tool wheel in the machining of a gear wheel of a batch with varying correction values because of the different form of the tooth flanks of the work piece wheel when the work piece wheel is machined by the tool wheel, and said forces are introduced into the tool holding fixture. In conventional arrangements, said force is opposed by the firm clamping of the tool wheel in the tool holding fixture. By comparison, with the arrangement in accordance with the invention, the plane of the tool wheel can be adjusted to the work piece wheel being machined because the axis of rotation of the tool wheel is displaceable, and thus the displacement also occurs automatically in adjustment to the work piece wheel. At the same time, the restoring force of the elastic means ensures that the displacement occurs only with actual stress, and the axes of rotation of tool wheel and tool holding fixture coincide again when they are no longer subject to stress (resting position of the arrangement). In particular, the toothing of the tool wheel for the machining of spur cut work piece wheels is also cylindrical.

Other characteristics, advantages and details of the invention follow from the following description of the attached drawing.

BRIEF DESCRIPTION OF THE DRAWING

The sole FIGURE shows in axial longitudinal section an arrangement of a tool wheel that is non-rotationally connected to a tool holding fixture.

DETAILED DESCRIPTION OF THE PREFERRED EMBODIMENT

Before any features and at least one construction of the invention are explained in detail, it is to be understood that the invention is not limited in its application to the details of construction and the arrangements of the components set forth in the following description or illustrated in the drawings. The invention is capable of other constructions and of being practiced or being carried out in various ways. Also, it is understood that the phraseology and terminology used herein is for the purposes of description and should not be regarded as limiting.

In an especially preferred embodiment, it is provided that the restoring force acting between the tool wheel and the tool holding fixture is directed axially. Thus, the tool wheel is held dependably axially in the scope of the allowed displacement motion.

To that end, it is provided that the tool wheel cannot move radially in the tool holding fixture. In this way, there is no radial relative motion between the wheels during the machining of the work piece wheel.

Preferably, the holding fixture has a bearing as a radial guide, which is cylindrical in radial section. Said bearing can dependably take up radial supporting forces.

The bearing is usefully formed in an area of the arrangement where an intercept of an axis of the tool holding fixture penetrates an axial boring of the tool wheel. Thus, the tool wheel can still advantageously be placed on the axis intercept of the tool holding fixture, which ensures a dependable accommodation of the tool wheel.

Especially advantageously, it is provided that the axial center area of the axis intercept is radially outwardly convex, and that the convexity is part of the bearing. The convexity therefore provides an area where a surface of the tool wheel located opposite the convexity can roll off or tilt when the tool wheel is displaced.

The convexity is usefully part of a spherical surface, and the center point of said sphere coincides with the intersection of the two axes of rotation when the tool wheel is displaced. From the perspective of a static case in an axial longitudinal section through the arrangement, the plane of the tool wheel can be rotated around an axis that is perpendicular to the cutting plane and through the axes of rotation of the tool holding fixture and/or the tool wheel.

Especially preferably, a sliding block effecting a non-rotational connection is developed in a crowned fashion at one of its axial lateral faces facing the axial groove walls.

Said crowning, which is preferably provided at the two axial lateral faces, provides the play required for the mutual displacement of the two axes of rotation X, Y within the grooves of the tool holding fixture and the tool wheel which accommodate the sliding block.

In an alternate embodiment, it can also be provided that a hub surface of the boring of the tool wheel is in its axial center area radially convex inwardly toward the axis of rotation. The displacement of the tool wheel then again results in a rolling or tilting motion of two surfaces on each other.

Usefully, the hub surface of the surface of the axial intercept located opposite the convexity of the axial intercept/the hub surface is developed as a surface of a regular cylinder. Thus, surfaces that are easy to construct can be provided for the components of the arrangement.

An especially preferred embodiment provides that the elastic means is arranged axially between the tool holding fixture and the tool wheel.

In a preferred embodiment, the tool holding fixture has a first lateral section that connects to the axial intercept and radially rises above said axial intercept, and the elastic means is arranged at least partially axially between a surface of the first lateral section facing the tool wheel, and the surface of the tool wheel opposite said surface. In this way, appropriate restoring force can be provided, as well as a fitting axial mounting of the tool wheel, with no changes being required at least with respect to the basic form of the tool holding fixture relative to conventional tool holding fixtures.

The same applies to the axially other side of the axial intercept. The tool holding fixture can have a second lateral section that can be detachably clamped on the axial intercept and radially rises above said axial intercept, and the elastic means can be arranged at least partially axially between a surface of the second lateral section facing the tool and the surface of the tool wheel opposite said surface. Thus, the tool wheel can be changed in a simple fashion, it is dependably held axially, and it can be displaced in opposite displacement directions relative to the resting position.

In particular, it is usefully provided that the elastic means has an elastic O-ring, in particular that it is comprised of two elastic O-rings. The O-rings can be advantageously integrated into the connection between the tool holding fixture and the tool wheel in a simple fashion, and they can also provide sufficient restoring force.

It may be provided that a recess is formed at the tool holding fixture to at least partially accommodate the elastic means, in particular the one or two O-rings.

Alternately or in addition, it may be provided that a recess is formed at the tool wheel to at least partially accommodate the elastic means, in particular the one or the two O-rings.

Especially, it is preferably provided that the strength of the restoring force of the elastic means is adjustable. To that end, it is provided that a spacing means can be clamped between two parts of the tool holding fixture, such as a spacer, for example. The restoring force can therefore also be adjusted by selecting the axial dimension of the spacer by prestressing the elastic means in the resting position.

From a dynamic view, the displacement of the tool wheel leads to a wobbling of the tool wheel. To that end, it is preferably provided that an expansion of the wobbling path, i.e. an effective deviation from the position of the tool wheel in the machining range for the machining of the end peripheral areas of the tooth flanks of the spur cut work piece wheel, is in a range of 5 to 50 µm, preferably 10 to 40 µm, in particular 20 to 30 µm, compared to the corresponding position of the tool wheel in resting position of the arrangement.

The tool holding fixture 2, which is shown in longitudinal sectional representation in the FIGURE, is clamped with its main element 3 in a tool spindle 9 in the conventional manner so that it can be offset from the tool spindle 9 around the axis of rotation Y of the tool holding fixture 2 in rotation. A clamping element 4 of the tool holding fixture 2, which is U-shaped in longitudinal section, can be clamped on the main element 3 in a boring 28 with thread 28.1 on the side of the tool holding fixture 2 opposite the tool spindle 9, with a ring-shaped spacer 5 being arranged between the clamping element 4 and the main element 3. The axial expansion of the spacer 5 determines the axial distance between opposing ring surfaces 23.1 and 24.1 of main element 3 and clamping element 4.

In that axial area, i.e. between lateral areas 23 and 24 of the tool holding fixture 2, their axial intercept 22 is formed in one piece with the lateral section 23 on which a tool wheel 1 having an axial boring 12 can be placed when the clamping element 4 with lateral section 24 is removed. In the position of the tool wheel 1 shown in the FIGURE relative to the tool holding fixture 2, the axis of rotation X of the tool wheel 1 coincides with the axis of rotation Y of the tool holding fixture 2.

As described so far, the arrangement shown in the FIGURE is similar to a conventional arrangement for the non-rotational connection of tool holding fixture 2 and tool wheel 1, with the torsional strength being obtained via a sliding block 7 that fixes the position of the tool holding fixture 2 and the tool wheel 1 in the direction of rotation.

However, the radial external surface of the axial intercept 22 of the tool holding fixture 2 is formed like a regular cylinder only at its axial end areas 22.2, whereas the axial center area of the radial external surface is outwardly convex in the form of a spherical surface 22.1 relative to the regular cylinder surface 22.2. The diameter of the axial boring 12 of the tool wheel 1 is coordinated with the diameter of the sphere, which is defined by the spherical surface 22.1, which has its center point Z on the axis Y. Thus, when the tool wheel 1 is positioned on the axis intercept 22 of the tool holding fixture 2, the spherical surface 22.1 of the tool holding fixture 2 and the area of the hub surface 12.1 of the tool wheel 1, which is opposite to said spherical surface, bear against each other; in the symmetrical resting position between the spherical surfaces 12.1 and 22.2 shown in FIG. 1, ring gap is formed.

Because at the same time, the clamping of the clamping element 4 on the main element 3 is selected so that the distance between the surfaces 23.1 and 24.1 is slightly greater in the clamping area than the axial dimension of the tool wheel 1, i.e., than the distance between the surfaces 13 and 14 of the tool wheel 1 facing the surfaces 23.1 and 24.1, there is also some play in axial direction between the surfaces 23.1 and 13 as well as the surfaces 24.1 and 14. The mounting of the tool wheel 1 in the tool holding fixture 2, or more specifically, the area 11 of the tool wheel 1 which borders the hub surface 12.1 in the space delimited by the surfaces 23.1, 22.1, 22.2 and 24.1, is therefore not fixed. Rather, in the representation shown in the FIGURE, a swing or displacement of the tool wheel 1 around any axis running orthogonal to the axis of rotation Y and through the center point Z of the spherical surface 22.1 is possible. In such a swing, the direction of the axis of rotation X of the tool wheel 1 is displaced relative to the direction of the axis of rotation Y of the tool holding fixture 2 because the axis of rotation X is positioned orthogonally to the plane of rotation of the tool wheel 1.

However, said swing or displacement of the axis of rotation X cannot occur with zero-force. Rather, an elastic O-ring 6.1, which protrudes axially at the surface 23.1 of the tool holding fixture 2 from a ring-shaped recess 26 coaxially to the axis of rotation Y, and a second elastic O-ring 6.2 that axially protrudes from a corresponding recess of the surface 24.1, ensure that the tool wheel 1 is held elastically by these two O-rings in the position shown in the FIGURE, which corresponds to the resting position of the arrangement, and where the axes of rotation X and Y coincide. However, if a force acts on the tool wheel 1 against the elastic restoring force of one of the elastic O-rings 6.1 or 6.2, the displacement motion described above occurs and the axis of rotation X is displaced relative to the axis of rotation Y. This flexible mounting of the tool wheel 1 relative to the tool holding fixture 2 is advantageous relative to a fixed mounting if the tool wheel has to machine slightly varying work piece wheels, for example because of the differences in the correction values of work pieces from different batches, as described earlier. For the following, it is then assumed that the resting position shown in the FIGURE corresponds to the machining situation for a batch of work piece wheels where the toothing 18 of the tool wheel 1 is completely adjusted for the machining of the end peripheral areas of the tooth flanks of the work piece wheels, and that the machining of said work piece wheels, which is thus executed without (unsymmetrical) stress on the tool wheel 1, occurs in the non-displaced resting position.

If the fixed mounting of the tool wheel 1 in the tool holding fixture 2 were maintained and the work piece wheels of a different batch then change, for example due to manufacturing tolerances in the previous hobbing of the work piece wheels, and such a work piece wheel were placed on the work piece spindle 9 of the machine, the machining of the end peripheral areas of the tooth flanks of the work piece wheel would be unsatisfactory due to the changed tooth flank profile. For example, too much material would be removed at one end during the deburring and formation of a chamfer, whereas no material at all would be removed at the other end of the same tooth flank, and a sufficient transformation into a chamfer would fail. Furthermore, if said tool wheel 1 were combined with a smoothing wheel, the smoothing function of said smoothing wheel would not be ensured.

This is avoided because the direction of the axis of rotation of the tool wheel 1 can be displaced. For example, when meshing with the toothing 18 of the tool wheel 1, the peripheral area of the tooth flank presses against the currently active machining surface of the tool wheel 1 at the first side, where according to the explanation above an excessive removal of material would have to be feared, and thus exerts force on the tool wheel 1. With a fixed mounting, said force would be introduced into the tool holding fixture 2 and be readily compensated because of the rigid connection between tool wheel 1 and tool holding fixture 2.

With the flexible mounting of the tool wheel 1, however, said force effects a displacement motion of the tool wheel 1 relative to the tool holding fixture 2 against the elastic restoring force of the correspondingly loaded O-rings 6.1 or 6.2, which corresponds to a displacement of the axis of rotation X relative to the axis of rotation Y.

As a result of said displacement, the position of the tool wheel 1 adjusts to the changed tooth flank profile of the machined work piece wheel of the different batch mentioned above. The machining surface of the tool wheel 1 is forced closer to the peripheral area of the tooth flank of the work piece wheel on the other side of the work piece wheel and can sufficiently machine that peripheral area, i.e., it can remove material, form a chamfer, and smooth the secondary burrs, if necessary. Thus, the peripheral areas of the tooth flanks will automatically be machined on both sides even if their profile deviates slightly relative to a specified correction value.

The tool wheel 1 can be developed in one piece or in a plurality of pieces (16, 17, 18). However, splitting it into two halves as described in EP 1 270 127 A1 is not absolutely necessary and neither is the proper adjustment of the two halves relative to each other.

The arrangement shown in the FIGURE is developed so that the wobbling of the tool wheel around an axis perpendicular to the tool axis in the machining area, which results in a dynamic view of the machining process, is in a range of 20 to 30 μm. To assure a dependable adjustment as described above, it is provided that the speed of the tool wheel 1 is not too high, i.e. approx. 30 to 200 rpm, in particular 100 to 150 rpm.

| List of Reference Symbols | |
|---|---|
| 1 | Tool wheel |
| 2 | Tool holding fixture |
| 3 | Main element |
| 4 | Clamping element |
| 5 | Spacer |
| 6.1, 6.2 | Elastic O-rings |
| 7 | Sliding block |
| 8 | Threaded screw |
| 9 | Tool spindle |
| 11 | Mounted area |
| 12 | Axial boring |
| 12.1 | Groove surface |
| 13 | Axial edge area |
| 14 | Axial edge area |
| 16 | First wheel |
| 17 | Second wheel |
| 18 | Toothing |
| 19 | Guide wheel |
| 22 | Intercept of axis |
| 22.1 | Spherical surface |
| 22.2 | Cylindrical surface |
| 24 | Second peripheral surface |
| 24.1 | Ring-shaped surface |
| 26 | Recess |
| 28 | Tapped hole |
| 28.1 | Screw thread |
| X | Axis of rotation (tool wheel) |
| Y | Axis of rotation (work piece holding fixture) |
| Z | Center point |

The characteristics described with reference to the sole FIGURE are not intended to limit the invention. Rather, the characteristics disclosed in the description and the claims may be essential either individually or in combination to realize the invention in its various embodiments.

The invention claimed is:

1. An arrangement (6, 7) for a non-rotational connection between a toothed machining tool wheel (1) rotatable about an axis of rotation (X), for the machining of end peripheral regions of tooth flanks of toothed workpiece wheels, and a tool holder (2) that can be driven rotationally around an axis of rotation (Y), comprising a toothed machining tool wheel (1) and a rotationally driven tool holder (2),
   said arrangement having in a region in which an axis intercept (22) of the tool holder passes through an axial bore hole (12) of the tool wheel (1), a bearing with a cylindrical radial section against which the tool wheel (1) is guided, radially immovably, in the tool holder (2), and the arrangement further comprising an axial holder with a side section (24) of the tool holder (2) that can be clamped releasably onto the axis intercept (22) on its one side and project radially therefrom,
   wherein the arrangement has an elastic means (6) against a restoring force of which the direction of the axis of rotation (X) of the toothed machining tool wheel (1) can be displaced relative to the direction of the axis of rotation (Y) of the tool holder (2), and wherein the elastic means (6.2) is arranged at least partially axially between a surface (24.1) of the clampable side section (24) facing the tool (1) and the surface (14) of the tool wheel (1) opposite said surface (24.1) of the clampable side section (24).

2. The arrangement in accordance with claim 1 wherein the restoring force between the tool wheel (1) and the tool holding fixture (2) acts in axial direction.

3. The arrangement in accordance with claim 1 wherein the intercept of the axis (22) is radially convex (22.1) in its axial center area with the radially convex axial center area being part of the bearing.

4. The arrangement in accordance with claim 3 wherein the convexity (22.1) is part of a spherical surface, and that the center point (Z) of said spherical surface corresponds to the intersection of the two axes of rotation (X, Y) when the toothed machining tool wheel (1) is displaced.

5. The arrangement in accordance with claim 3 wherein a hub surface (12.1) of the toothed machining tool wheel is opposite the radially convex axial center area (22.1) of the axial intercept with the hub surface being in the form of a cylinder.

6. The arrangement in accordance with claim 1 wherein a hub surface of the axial bore hole of the toothed machining tool wheel is in its axial center area radially convex inwardly toward the axis of rotation with the radially convex axial center area being part of the bearing.

7. The arrangement in accordance with claim 1 wherein the elastic means (6) is arranged axially between the tool holding fixture (2) and the toothed machining tool wheel (1).

8. The arrangement in accordance with claim 1 wherein the tool holding fixture (2) has a first lateral section (23) that connects to the axial section (22) and radially rises above said axial section, and the elastic means (6.1.) is arranged at least in part axially between a surface (23.1) of the first lateral section (23) facing the toothed machining tool wheel (1) and the surface (13) of the toothed machining tool wheel (1) opposite said surface (23.1).

9. The arrangement in accordance with claim 1 wherein the elastic means (6) comprises one or two elastic O-rings (6.1, 6.2).

10. The arrangement in accordance with claim 1 wherein the tool holding fixture (2) has a recess to accommodate at least part of the elastic means.

11. The arrangement in accordance with claim 1 wherein the toothed machining tool wheel has a recess to accommodate at least part of the elastic means.

12. The arrangement in accordance with claim 1 wherein the strength of the restoring force of the elastic means is adjustable.

13. The arrangement in accordance with claim 12 wherein the strength of the restoring force can be adjusted with a spacer (5) that can be clamped between two elements of the tool holding fixture.

14. The arrangement in accordance with claim 1 wherein during machining, a displacement of the axis of rotation (X) of the toothed machining tool wheel relative to the axis of rotation (Y) of the tool holder occurs thereby resulting in a wobbling of the tool wheel in the machining area, said wobbling being an amount in the range of 5 to 50 μm.

* * * * *